Aug. 13, 1968 W. T. MOORE 3,396,747

FLUID HANDLING APPARATUS INCLUDING A REEL

Filed April 27, 1966 5 Sheets-Sheet 1

INVENTOR
WARREN T. MOORE

BY Burns, Doane, Benedict,
Swecker & Mathis
ATTORNEYS

Aug. 13, 1968     W. T. MOORE     3,396,747
FLUID HANDLING APPARATUS INCLUDING A REEL
Filed April 27, 1966     5 Sheets-Sheet 2

INVENTOR

WARREN T. MOORE

BY Burns, Doane, Benedict,
Swecker & Mathis

ATTORNEYS

INVENTOR
WARREN T. MOORE

Aug. 13, 1968 W. T. MOORE 3,396,747
FLUID HANDLING APPARATUS INCLUDING A REEL
Filed April 27, 1966 5 Sheets-Sheet 5

INVENTOR

WARREN T. MOORE

BY *Burns, Doane, Benedict,*
*Swecker & Mathis*

ATTORNEYS

# United States Patent Office 3,396,747
Patented Aug. 13, 1968

3,396,747
FLUID HANDLING APPARATUS INCLUDING A REEL
Warren T. Moore, Houston, Tex., assignor to Brown & Root, Inc., Houston, Tex., a corporation of Texas
Filed Apr. 27, 1966, Ser. No. 545,656
15 Claims. (Cl. 137—355.21)

This invention relates to a fluid handling apparatus. In particular the invention relates to a fluid handling apparatus used to deliver fluid through an elongate flexible conduit, such as for example a hose, of the type wherein the hose is supported on a reel which may be rotated by a motor.

One particular application for which the present fluid handling apparatus is primarily but not exclusively intended, is that of supplying fluid under pressure to fluid pressure operated tools of the type intended for use under water. In utilizing a tool of this type for such purposes as, for example, the maintenance and installation of under water pipe lines or the recovery of marine salvage, it is common to supply the tool with the fluid required for its operation through a hose. The hose is generally connected to a source of fluid under pressure supported above the surface of the water on a ship, pontoon or other suitable structure. For reasons of safety and convenience the hose is frequently stored and supported on a suitable reel which may sometimes be adapted for rotation by a reel motor connected to the reel.

In utilizing a fluid handling apparatus of the type including a reel adapted to be rotated by a reel motor, it is often advantageous for reasons of economy, compactness and convenience to provide a reel motor which derives its power from the source of fluid under pressure rather than to utilize a reel motor requiring the provision of an independent and additional power source. Various forms of fluid handling apparatus of this type have been previously developed for various specialized applications other than that presently considered.

Such prior devices have generally included a reservoir for storing fluid, a pump in fluid communication with the reservoir and a single hose for the fluid, which may be connected to the pump. The hose may usually be supported on a freely rotatable reel connected to a unidirectional, fluid pressure responsive, reel motor. The reel motor may be selectively placed in fluid communication with the pump by an operator standing adjacent and externally of the device, so as to rotate the reel to rewind the hose.

Such prior fluid handling apparatus as have been described, though generally suitable for the particular applications for which they have been developed, may prove unsatisfactory for use in supplying fluid under pressure to a fluid pressure operated tool intended for use under water, for a number of reasons. For example, one major disadvantage arises from the provision of a unidirectional reel motor which may sometimes be used only to rewind the hose. Where this is the case, in order to unwind the hose from the reel it is frequently necessary for the operator to exert a manual pull on the free end of the hose. Manual unwinding of the hose in this manner may be proved impracticable for hose used to supply an under water tool, which is frequently of relatively heavy gauge and considerable length, in that the hose may possess an unacceptably high moment of inertia when coiled on the reel. In this event, a pull on the free end of the hose may cause considerable tensile strain on the hose thereby impairing the life of the hose and possibly causing leakage of fluid at the point of connection of the hose to the tool. Leaks of this nature may permit pressure fluid to escape into the surrounding water and may also permit contamination of pressure fluid in the hose by water or brine entering the leak. Furthermore, the inertia of the hose when coiled on the reel may be so great as to seriously reduce the rate at which hose may be withdrawn from the reel by unaided manual exertion.

A further disadvantage arises from the utilization of a freely rotatable reel, in that the weight of a portion of hose depending from the reel over the side of the ship or other support may be sufficient to unwind the remainder of the hose from the reel. The action of wind, waves, local sea currents or the like on the depending portion of hose may have a similar effect.

Yet another problem associated with the use of prior fluid handling apparatus of the type described may arise from the lack of particular provision on such apparatus of a support for the operator from which he may control movement of the hose while maintaining the hose in direct and substantially unobstructed view. Lack of operator support may present a particular problem in the case of a fluid handling apparatus adapted to be mounted on a floating vessel adjacent a side or end thereof, as the operator standing on the vessel adjacent the reel in a position from which he may control the movement of the hose may be restricted to an oblique and unsatisfactory view of the hose passing over the side of the vessel.

An additional problem preventing the successful use at sea of prior fluid handling apparatus of the type described may arise if the fluid reservoir is so constructed as to permit fluid to move freely within the reservoir in response to wave action. In this event, movement of the fluid within the reservoir may cause intermittent starvation of the pump leading to interruptions in the supply of fluid directed to the tool preventing successful operation thereof.

Another problem may arise in the use of such a prior apparatus, if the delivery hose should rupture, in which event much relatively expensive pressure fluid might be lost.

In recognition of the need for an improved fluid handling apparatus adapted to deliver fluid under pressure to a fluid pressure operated tool of the type intended for use under water, it is therefore a general object of the present invention to provide a fluid handling apparatus which substantially obviates or minimizes problems such as those previously noted.

It is a particular object of the invention to provide a fluid handling apparatus including a hose for delivering fluid from a source of fluid under pressure, a rotatable reel supporting the hose and a reel motor drivingly connected to the reel, wherein power for actuating the reel motor to rotate the reel to selectively wind and unwind the hose, is derived from the source of fluid under pressure.

It is an additional object of the invention to provide a fluid handling apparatus including a fluid pressure operated tool, a hose connected to the tool for delivering fluid to the tool from a source of fluid under pressure, a rotatable reel supporting the hose and a fluid pressure operated reel motor drivingly connected to the reel, so uniquely constructed that fluid may continue to be directed to the tool for the operation thereof at the same time that fluid is being directed to the reel motor to selectively wind and unwind the hose.

It is another object of the invention to provide a fluid handling apparatus including a hose reel supporting a hose of the type used to deliver fluid from a source of fluid under pressure, so constructed that the hose reel is automatically prevented from rotating when the fluid is being directly delivered to the hose.

It is another object of the invention to provide a fluid handling apparatus including a hose reel adapted to be mounted on a vessel so constructed that an operator controlling the movement of hose from the reel may have a substantially direct and unobstructed view of the hose leaving the reel in its path from the vessel.

It is yet a further object of the invention to provide a fluid handling apparatus for supplying fluid to an underwater tool from an above the surface source of fluid pressure, so uniquely constructed that movement of the source of fluid under pressure in response to wave movement of the water does not cause intermittent interruption in the supply of fluid to the tool.

It is another object to provide a fluid handling apparatus including a delivery hose so constructed that flow of fluid through the hose is terminated automatically upon rupture of the hose.

One aspect of the present invention designed to accomplish at least some of the desired objects, entails the provision of a fluid handling apparatus including a source of fluid under pressure, a delivery hose for directing fluid to a fluid pressure operated tool and a rotatable reel on which the delivery hose may be wound. The apparatus further includes fluid inlet means connected with the reel for directing fluid to the delivery hose. Pressure responsive driving means connected with the reel may selectively rotate the reel in winding and unwinding directions in which the delivery hose is wound onto and from the reel respectively. The driving means includes first and second conduit means for separately directing fluid to the driving means. The driving means rotates the reel in the winding direction when fluid is directed to the driving means through the first conduit means and rotates the reel in the unwinding direction when fluid is directed to the driving means through the second conduit means. Fluid directing, control means in fluid communication with the source of fluid under pressure may be selectively connected with the fluid inlet means, the first conduit means and the second conduit means in order to selectively direct fluid to one of the fluid inlet means, first conduit means and second conduit means respectively so as to deliver fluid under pressure to the tool, or to wind or unwind hose from the reel respectively.

A particularly significant aspect of the invention involves the provision of a return hose in fluid communication with the tool, which may be wound on the reel concurrently with the delivery hose, for returning pressure fluid leaving the tool. Fluid return means connected with the reel in fluid communication with the return hose directs the pressure fluid returning from the tool through the return hose to a fluid reservoir forming a part of the source of the fluid under pressure. This arrangement permits the fluid to be conserved and recycled in an economically advantageous manner.

A further independently significant facet of the invention involves the provision of brake means secured to frame means supporting the reel for rotation. The brake means is operatively connected to the source of fluid under pressure and with the fluid inlet means and is automatically actuated to prevent movement of the reel whenever the fluid pressure in the fluid inlet means is equal to that of the source of the fluid under pressure. This arrangement ensures that hose may not be unwound from the reel by external forces acting on the reel or the hose when the hose is being utilized to deliver fluid to operate the tool.

An aspect of the invention that is of particular significance when the invention is used on board a floating vessel resides in the provision of platform means for supporting the operator. When the invention is used at sea, the frame means is adapted to be mounted on the vessel adjacent a side or end thereof with the axis of rotation of the reel generally parallel and adjacent the edge of the vessel with a forward peripheral surface of the reel extending outwardly of the vessel so as to permit the hose to be unreeled over the side of the vessel. An aperture is provided in the frame means to permit the hose to pass vertically therethrough. The platform means is connected to the frame means and extends outwardly therefrom on the opposite side of the hose from the reel so as to enable the operator standing on the platform means to maintain a direct view of the hose in its passage over the side of the vessel.

One further aspect of the invention that also becomes of particular significance in the environment of use at sea, involves the provision of a fluid reservoir including a lower reservoir in fluid communication with a pressure means for delivering fluid from the lower reservoir under pressure. An upper reservoir is supported above the lower reservoir by support means connected to the upper and lower reservoirs. The upper reservoir is in fluid communication with the fluid return means by which fluid leaving the tool through the return hose is returned to the fluid reservoir. The support means include interconnecting conduit means for directing fluid between the upper and lower reservoirs so as to maintain a positive head of pressure on the fluid in the lower reservoir so that fluid starvation of the pressure means caused by external wave action of the sea moving the fluid in the lower reservoir is reduced.

An additional facet of this invention intended to prevent loss of operating fluid if the hoses should rupture involves the provision of a bypass valve adapted to bypass the hoses whenever the pressure of returning fluid drops below certain operating limits.

The preferred embodiment of the invention is illustrated in the accompanying drawings, in which.

Figure 1:
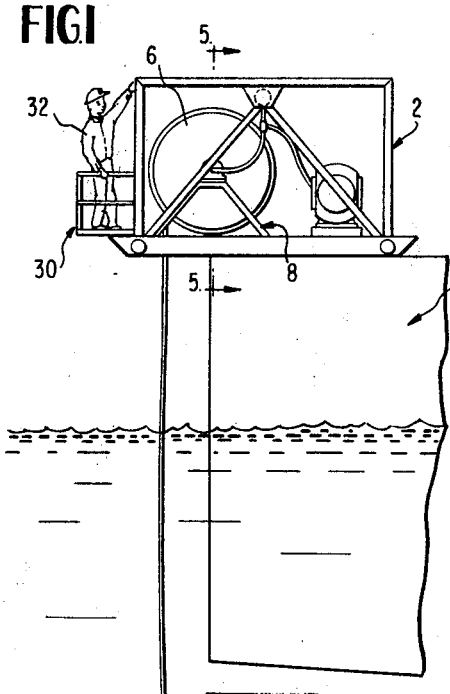
FIGURE 1 is a side view of one preferred embodiment of a fluid handling apparatus according to the present invention, showing the apparatus mounted on a floating vessel, supplying fluid to a fluid operated tool used under water.
Figure 2:
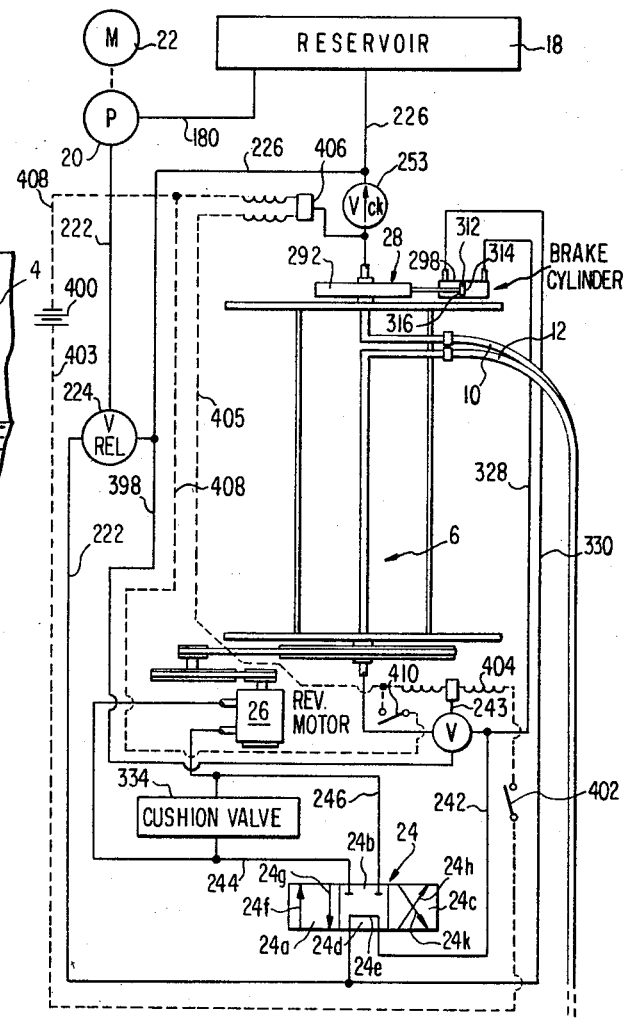
FIGURE 2 is a schematic diagram showing the fluid circuitry of the fluid handling apparatus shown in FIGURE 1.
Figure 2:
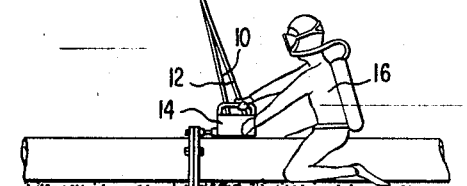

Referring to FIGURES 1 and 2 of the drawings, one preferred embodiment of the invention there shown comprises a generally rectangular outer frame 2 adapted to be mounted on a floating vessel 4 adjacent a side or end thereof. A reel 6, rotatably mounted on a reel support frame 8 within the outer frame 2, supports two coextensive, flexible, elongate conduits, one of which is a delivery hose 10 and the other a return hose 12. The free ends of the hoses are connected to a fluid pressure operated tool 14, such as, for example, an impact wrench held by a diver 16. Fluid contained within a reservoir 18 integral with the outer frame 2 is supplied to a fluid pump 20 driven by an engine 22. Fluid leaving the pump 20 under pressure passes to a control valve 24 by which the fluid may be selectively directed through various routes to the delivery hose 10. The control valve 24 may be manipulated to direct fluid directly through reel 6 to hose 10 or alternatively may be manipulated to direct fluid to a fluid motor 26 drivingly connected to the reel 6 to selectively rotate the reel in either a forward or reverse direction to unwind or wind the hose respectively. Fluid leaving the reel motor 26 passes back through the control valve 24 and is directed thereby to the delivery hose 10, so that the supply of fluid to the tool 14 is not interrupted by rotation of the reel 6.

Pressurized fluid, which may comprise hydraulic fluid, is delivered to the tool 14 through the delivery hose 10 and is returned from the tool 14 to the reservoir 18 via the return hose 12. A brake 28, secured to the reel support frame 8, is applied automatically to prevent rotation of the reel 6 whenever the control valve 24 is selected to direct fluid directly to the delivery hose 10.

An operator's platform 30 connected to the outer frame 2 extends sidewardly and outwardly from the floating vessel so that an operator 32 standing on the platform 30 and controlling the movement of hose from the reel 6 by use of the control valve 24, may maintain the hoses in direct and substantially unobstructed view.

*The outer frame and reel support frame*

Figure 3:
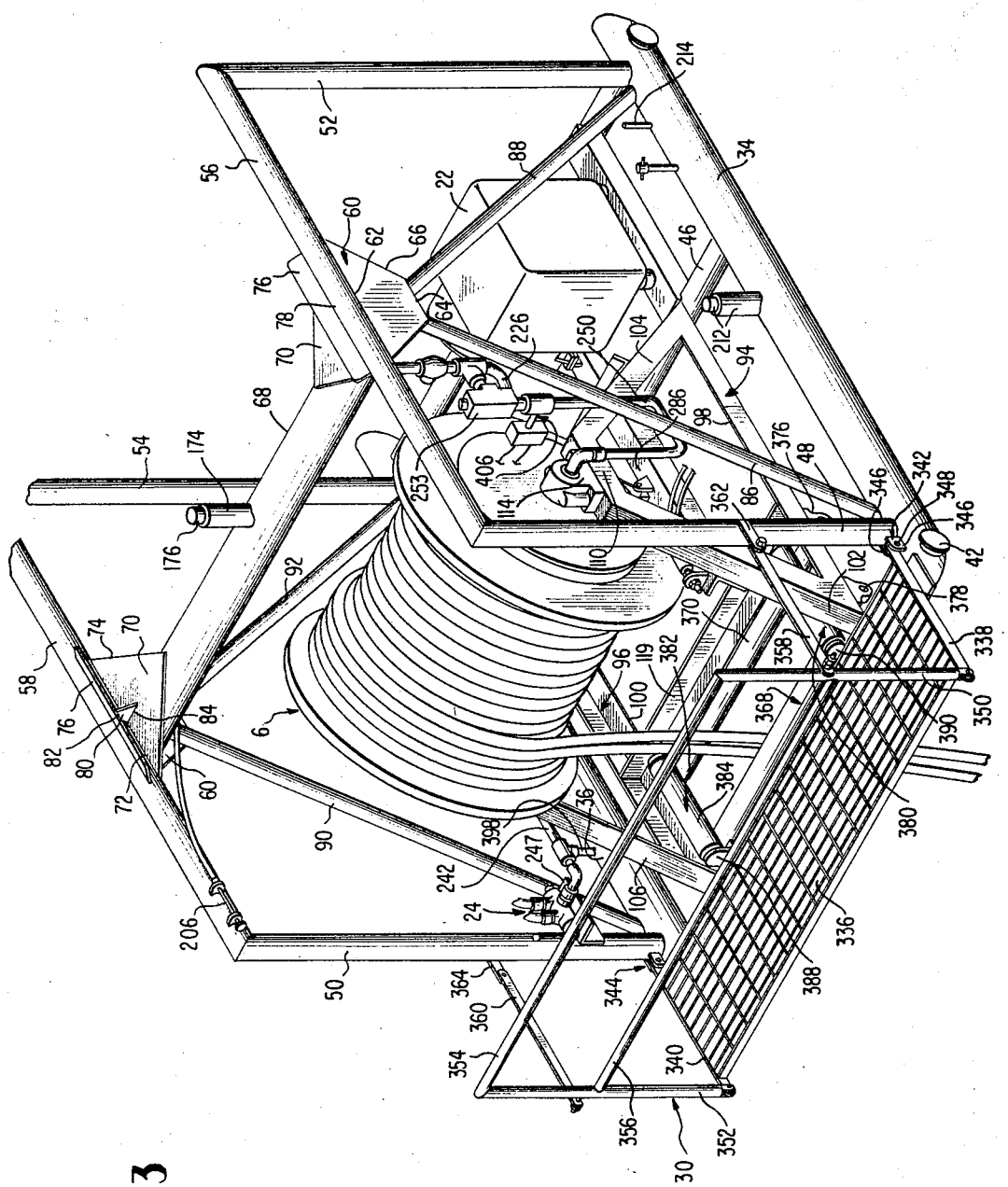
FIGURE 3 is a perspective view of the fluid handling apparatus shown in FIGURE 1, showing the operator's platform in operative position.
Figure 4:
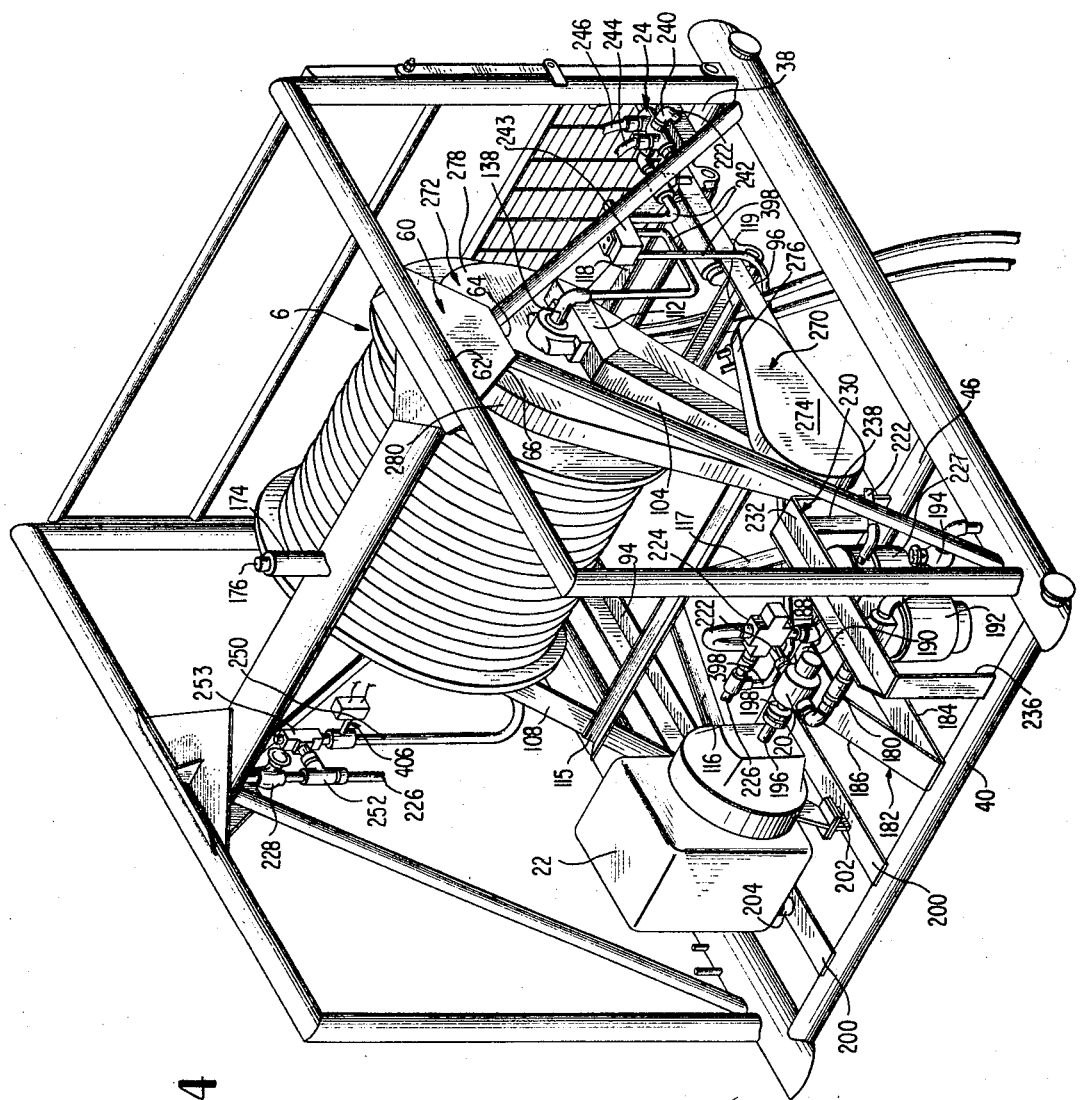
FIGURE 4 is a perspective view of the fluid handling apparatus shown in FIGURE 1, showing the engine, fluid pump, and reel drive.

Referring in more detail to FIGURES 3 and 4, the previously described outer frame 2 comprises a generally rectangular, vertically extending, open tubular framework having forward extremities, and right and left sides. The outer frame 2 includes a horizontally disposed, rectangular base defined by laterally spaced, opposed, right and left tubular longitudinal base members 34 and 36, respectively, joined at their forward and rear extremities by longitudinally spaced, opposed, forward and rear transverse tubular base members 38 and 40, respectively. Each extremity of each transverse base member is received within a hole extending transversely through the adjacent longitudinal base member adjacent the extremity thereof. Each extremity of each base member is secured to the adjacent portion of the longitudinal base member by welding, although it will be appreciated that other methods of connection may be employed if this is desired. The extremities of each of the transverse and longitudinal base members are closed by means of a plurality of plates 42 and 44, respectively, welded in position (although threaded caps, or the like, may be utilized) to define enclosed chambers within the longitudinal and transverse base members.

A central transverse base member 46, having its opposed extremities secured to the longitudinal base members 34 and 36, is positioned intermediate and parallel to the forward and rear transverse base members 38 and 40, respectively, adjacent and spaced rearwardly of the midportions of the longitudinal base members. Members 46, 38 and 40 do not communicate with members 34 and 36.

Right and left, coextensive, tubular forward vertical support members 48 and 50, respectively, are secured to the right and left base members 34 and 36 adjacent the forward extremities thereof and extend vertically upwardly at right angles to the base members. Similar and coextensive, tubular right and left, rear vertical support members 52 and 54, respectively, are secured to the right and left base members 34 and 36 adjacent the rearward extremities thereof, respectively.

A horizontally disposed, right top member 56, parallel to the right base member 34, is supported on the free upward extremities of the right vertical support members 48 and 52. A similar left top member 58 is secured to and supported by the free extremities of the left forward and rear vertical support members 50 and 54, respectively, in spaced parallel relation to the left base member 36.

Each top member 56 and 58 is provided with a depending plate 60 adjacent its midpoint. Each depending plate is defined by a top edge 62 secured to the adjacent top member, a bottom edge 64 parallel to the top edge, and two downwardly and inwardly inclined side edges 66 intersecting the bottom edge 64.

A tubular transverse top member 68, having its opposed extremities secured to and supported by the depending plates 60, extends horizontally and transversely of the outer frame. To provide additional security of mounting for the transverse top member 68, two inwardly directed, horizontally disposed, triangular top plates 70 are provided, one at each extremity of the transverse top member 68. Each top plate 70 includes a base edge 72 secured to the adjacent top member and two mutually inclined, intersecting edges 74 disposed symmetrically of the longitudinal axis of the transverse top member 68. Further support for the top plate 70 is provided by two reinforcing plates 76. Each reinforcing plate is of rectangular shape and includes a longitudinal base 78 secured to the adjacent longitudinal top member extending radially outwardly therefrom in vertically spaced relation from the adjacent top plate 70 parallel to the base edge 72 thereof.

To connect each reinforcing plate 76 with the adjacent top plate 70 so that the latter is provided with additional support, a vertical web 80 is provided having one edge 82 secured to the reinforcing plate and another edge 84 secured to the top plate 70. Each web 80 is positioned along the longitudinal axis of the transverse top member 68.

Forward and rear, right diagonal members 86 and 88, respectively, of tubular form, are connected at their upper extremities to the underside of the top transverse member 68 adjacent the right extremity thereof. The forward and rear diagonal rods 86 and 88 are connected at their respective lower extremities to the right base member 34 adjacent and inwardly of the points of connection thereto of the right, forward and rear vertical support members 48 and 52, respectively. Similarly positioned, forward and rear, left diagonal members 90 and 92, also of tubular form, extend between the transverse top member 68 adjacent the left end thereof and the left base member 36 adjacent and inwardly of the respective points of connection thereto of the forward and rear left vertical support members 50 and 54, respectively. The diagonal members 86, 88, 90 and 92 provide bracing for the vertical support members, thereby increasing the rigidity of the outer frame 2.

As previously described, the reel 6 is supported on a reel support frame 8 mounted in the outer frame 2. The reel support frame 8 includes laterally spaced, opposed, horizontally disposed, right and left, longitudinal lower members 94 and 96, respectively. Each lower member is positioned in spaced parallel relation from the adjacent longitudinal base member and is secured at its forward extremity to the forward base member 38, and at its rear extremity to the central base member 46. Each lower member in the preferred embodiment comprises a vertically extending web 98 having an inwardly directed, horizontally disposed flange 100 at its lower extremity. Vertical, upwardly extending, forward and rear, right inclined members 102 and 104, respectively, are secured to the forward and rearward extremities of the right lower member 94. Similar left, forward and rear left inclined members 106 and 108, respectively, are provided at the forward and rear extremities of the left lower members 96. Right and left, horizontally disposed top members 110 and 112, respectively, are supported by and secured to the free vertical extremities of the right and left, forward and rear inclined members respectively. Each top member 110 and 112 has secured thereto a bearing block 114. The bearing blocks 114 on the right and left top members, as will be discussed hereinafter, support the reel 6 for rotation on the reel support frame 8 within the outer frame 2.

Additional rigidity is provided for the reel support frame 8 by a horizontally disposed transverse frame member 115 having its opposed extremities secured to the right and left rear inclined members 104 and 108 adjacent the midpoints thereof. The transverse frame member 115 is strengthened by right and left transverse braces 116 and 117 secured at their upper extremities to the transverse frame member 115 adjacent the midpoint thereof. The braces 116 and 117 are secured at their respective lower extremities to the right and left rear inclined members 104 and 108 adjacent the points of connection thereof to the right and left lower members 94 and 96, respectively. The transverse frame member 115 and brace members 116, 117 are formed of right angle channel sections (i.e. structural angles) of similar cross section to that of the lower members 94 and 96.

Additional rigidity is provided by longitudinally spaced forward and central, transverse lower members 118 and 119 respectively, also of right angle channel section similar to that of the lower members, secured at their opposed extremities to the right and left lower members 94 and 96. The forward transverse member 118 is positioned adjacent the forward base member 38 and the central transverse member 119 is spaced rearwardly therefrom so as to define an aperture in the frame through which the hoses 10 and 12 may pass from the reel 6 as will be described hereinafter. The forward and central transverse members 118 and 119 are of right angle channel section similar to that utilized for the lower members 94 and 96 and have their lower horizontal flanges supported at their extremities on the horizontal flanges of the right and left lower members 94 and 96.

It will be appreciated that the outer frame 2 in addition to supporting the hoses and various other elements of the fluid handling apparatus also provides significant protection therefor which is particularly important for use at sea.

*The reel*

Figure 5:
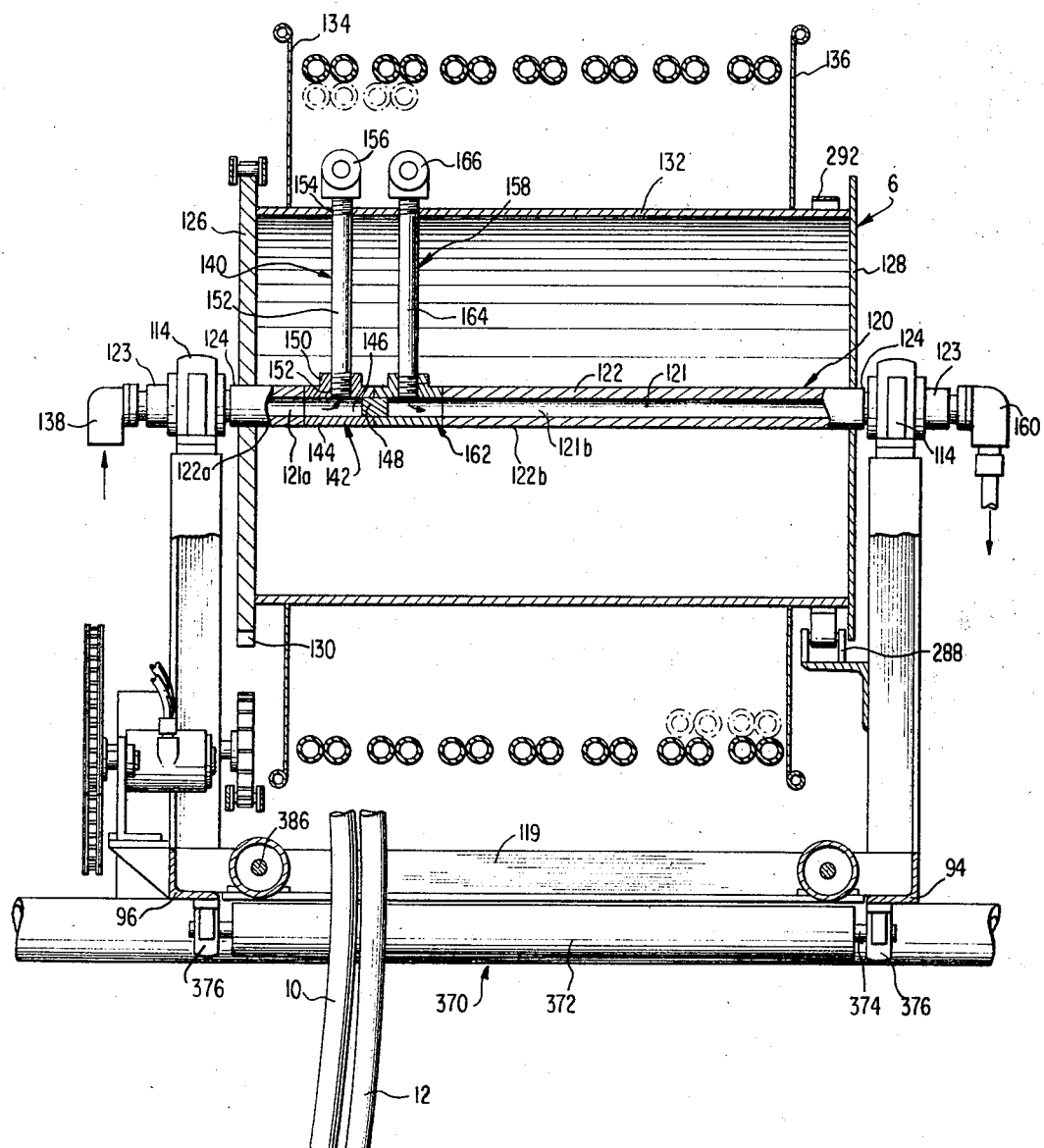
FIGURE 5 is a part sectional view of a portion of the fluid handling apparatus shown in FIGURE 1, taken along the lines 5—5 therein, showing the fluid inlet and return branch connections to the hoses and the hose protecting rollers.

Referring in more detail to FIGURE 5, the reel 6 includes a horizontally disposed shaft 120, extending transversely of the reel support frame 8, provided with an interior passage 121. The shaft 120 includes a central portion 122 of constant outside diameter and two end bearing portions 123 of reduced outside diameter relative to the central portion 122, which are received within and extend through the adjacent previously described bearing blocks 114 to support the shaft 120 horizontally for rotation. Any lateral movement of the reel 6 caused by hose forces exerted on the reel 6 is resisted by locking the shaft 120 to the inner races (not shown) of the bearing blocks 114.

A shoulder 124 defined by a radial edge of the central portion 122 at the junction with the adjacent bearing portion 123 is spaced closely from the adjacent bearing block 114.

Spaced opposed, left and right circular flanges 126 and 128, respectively, concentric with the shaft 120, are secured to the central portion 122 of the shaft adjacent the opposed left and right extremities thereof. The left flange 126 is of relatively greater thickness than the right flange 128 and is provided with driving teeth 130 about its periphery, for a purpose to be described hereinafter.

A drum 132 concentric with and spaced from the shaft 120 extends between the flanges 126 and 128 and has its opposed lateral extremities secured to the interior surfaces of the left and right flanges 126 and 128. The diameter of the drum 132 is less that that of either the left-or-right-hand flanges 126 and 128 but is sufficiently great to prevent the innermost layers of the hoses wound on the drum 132 from being bent to less than their minimum safe radius of curvature.

In order to guide the hoses on the drum 132 and to retain the hoses in position thereon, spaced opposed, vertically extending, circular left and right discs 134 and 136, respectively, concentric with the shaft 120, are secured to the drum 132 adjacent and inwardly of the left and right flanges 126 and 128. The discs 134 and 136 extend radially outwardly of the drum and are provided with beading at their radially outward edges to increase their rigidity and to reduce the possibility of damaging the hose. Hose supported on the reel 6 is wound about the drum 132 between the discs 134 and 136.

As previously described, the delivery and return hoses 10 and 12, respectively, are supported on the reel 6 and may be wound and unwound concurrently therefrom. So that fluid may be directed to the delivery hose 10, the left extremity of the shaft 120 is internally threaded for connection to a right angle, swivel, pipe joint 138. Swivel pipe joints of this type are widely commercially available and permit fluid to be delivered from a fixed conduit secured to the joint to the interior of the shaft 120 while the shaft is rotating.

Shaft portion 122 includes, when viewed as shown in FIGURE 5, a left section 122a and a right section 122b, both of identical cross sectional configuration. Shaft section 122a provides a portion 121a of passage 121 while shaft section 122b provides a portion 121b of passage 121.

Fluid entering the shaft 120 through the swivel pipe joint 138 is directed to the delivery hose 10 through a delivery branch connection, generally designated 140, which includes a base portion, i.e., a T-fitting, 142 inserted axially in the shaft 120. The base portion 142 comprises a transversely extending tubular body 144 concentric with the shaft 120, having an internal passage 146 aligned with and defying a portion of the passage section 121a in the shaft 120. The tubular body 144 is of the same inside and outside diameters as the portion 122a of the shaft and includes a closed right extremity defined by a plug 148, which separates passage portions 121a and 121b, and a radially outwardly directed, circular boss 150 on the periphery of the body. The circular boss 150 is provided with a concentric threaded aperture 152 extending to the interior passage 146 of the body. A delivery pipe 153 having one threaded extremity received within and secured to circular boss 150 is in fluid communication with the interior passage 146 of the body and extends radially outwardly from the body through an aperture 154 provided in the drum 132. The free extremity of delivery pipe 152 is provided with a right angle hose connector 156, which may be of any suitable commercially available type, connecting the free extremity of the delivery pipe 153 to the delivery hose 10. The arrangement described permits fluid to be directed through the swivel joint 138, the portion 121a of passage 121 of the shaft 120, the passage 146 in the base portion 142, the delivery pipe 153, and the hose connector 156 to the delivery hose 10.

A similar return branch connection 158 comprising a right angle swivel pipe joint 160 connected to the right extremity of shaft 120, a return base portion or T-fitting 162, communicating with passage portion 121b, a return pipe 164, and return hose connector 166, is provided for fluid returning from the tool from the return hose 12. As shown in FIGURE 5, plug 148 may serve to connect and align fittings 142 and 162.

It will be appreciated that the details of construction of the delivery and return branch connections 140 and 158, respectively, may be varied by one skilled in the art in any number of conventional ways. For example, the base portions may be dispensed with and the delivery and return pipes tapped directly into the shaft 120 on either side of a plugging obstruction disposed therein. It will also be understood that portions 121a, 121b, 162, 144 and 148 are integrally interconnected by conventional fastening means such as screwthreads or welding.

*Fluid system*

Figure 6:
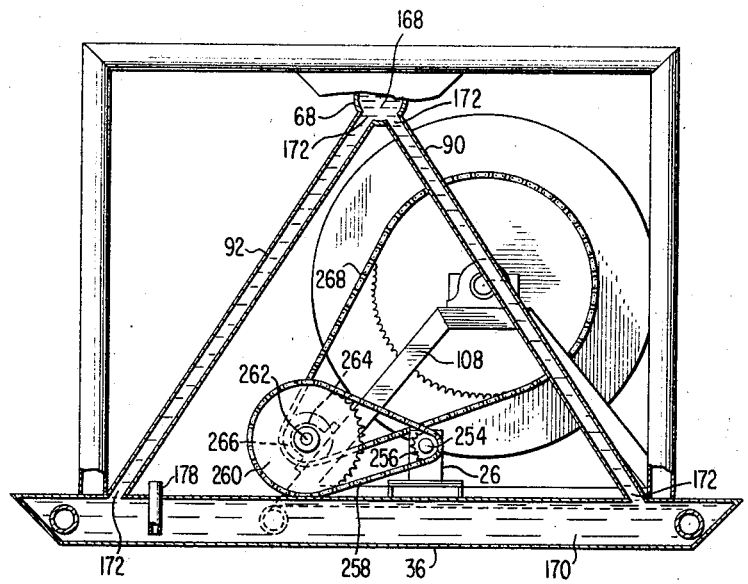
FIGURE 6 is a part sectional, side view from the left side of a portion of the fluid handling apparatus shown in FIGURE 1, showing the fluid reservoirs and reel drive.

In FIGURES 2, 4 and 6, the fluid system may be seen to include vertically spaced, upper and lower, hydraulic fluid reservoirs 168 and 170, defined by the closed interior volumes of the previously described top transverse member 68 and left base member 36, respectively. The previously mentioned forward and rear, left diagonal members 90 and 92, respectively, are provided with interior openings 172 at their points of connection to the top transverse member 68 and the left base member 36, respectively, so as to form connecting fluid conduits placing the upper and lower fluid reservoirs 168 and 170 in fluid communication with each other. A vertically extending filling spout 174 and cap 176 are provided on the top transverse member 68 through which the upper reservoir 168 may be filled. Fluid is withdrawn from the lower reservoir 170 by a vertically extending supply pipe 178 passing through an upper portion of the periphery of the left base member 36 adjacent the rearward extremity thereof. A supply line 180 connects the supply pipe 178 to the previously described fluid pump 20.

The arrangement of fluid reservoirs, whereby fluid in the upper reservoir 168 is in fluid communication with that in the lower reservoir 170 so that a positive head of pressure is exerted on the fluid in the lower reservoir 170, possesses a considerable advantage in the environment of use at sea. Such an arrangement substantially prevents the fluid supply pipe 178 from ever becoming uncovered by fluid as a result of wave motion of the sea acting on the floating supporting vessel. This arrangement thus eliminates the likelihood of intermittent fluid starvation of the pump.

By providing fluid connections 172 at each extremity of the lower reservoir 170, fluid supplied from the upper reservoir 168 will always have at least one preferential path to follow, irrespective of the direction in which the floating vessel is pitched by sea action. Another significant advantage is derived from the perpendicular relation existing between the longitudinal axes of the upper and lower reservoirs 168 and 170.

In a typical situation at sea in which the supporting vessel may be pitching or rolling about only one axis at a time, such an arrangement of reservoirs insures that fluid in at least one of the reservoirs at any time remains substantially undisturbed by the movement of the vessel.

Fluid is withdrawn from the lower reservoir, 170 through the supply pipe 178 and the supply line 180 by the previously described pump 20 which may be of any suitable type, such as for example, a rotary pump. The pump is supported upon a pump bracket 182 secured to the outer frame 2. The pump bracket 182 includes a longitudinally extending base portion 184 secured at its exposed extremities to the central and rear base members 46 and 40, converging rear and forward web portions 186 and 188, respectively, extending upwardly from the extremities of the base portion 184 and a horizontally disposed top portion 190 on which the pump 20 is supported. The top portion 190 is generally parallel to the base portion 184 and has its opposed extremities secured to the exposed upward extremities of the web portions 186 and 188.

A first fluid filter 192 and a manually operable shut-off valve 194 are connected in series in the supply line 180.

In order to drive the rotary pump 20, the previously described fuel powered engine 22 is provided. The unit 22 may be an engine of any suitable type such as, for example, a diesel engine or internal combustion engine, or may comprise an electric motor. Unit 22 includes a rotary output shaft 196 drivingly connected to a rotary input shaft 198 of the rotary pump 20. The engine 22 is supported on the frame 2 by two laterally spaced, longitudinally extending engine brackets 200 secured at their opposed extremities to the central and rear base members 46 and 40. Suitable anti-vibration mountings 202 and 204, such as for example rubber mountings, are provided for securing the engine 22 to the engine brackets 200 in order to reduce vibration. The engine 22 includes conventional controls including a throttle control 206 which, as best seen in FIGURE 3, is positioned on the left top support member 58 in a convenient position for the operator controlling the apparatus to control the speed of the engine 22. Fuel for the engine 22 is stored within a fuel reservoir 208 (see FIGURE 7) defined by the interior volume of the right base member 34. Fuel may be supplied to the fuel reservoir 208 through a vertically extending fuel spout 210 and breather cap 212 positioned on the right base member 34 in fluid communication with the fuel reservoir 208. A vertically extending fuel outlet pipe 214 passing through one wall of the right base member 34 delivers fuel from the interior of the fuel reservoir 208 to the engine 22. A removable dip stick 216 slidably contained within a housing sleeve 218 positioned on the right base member 34 is provided to enable the level of fuel within the fuel reservoir 208 to be guaged.

It will be noted that by utilizing the left and right base members 34 and 36 as fluid and fuel reservoirs respectively, the center of gravity of the fluid handling apparatus is advantageously kept as close to the ground as possible, thereby increasing the stability with which the apparatus may be mounted on a floating vessel.

Fluid leaving the pump 20 under pressure is directed through a delivery conduit 222 to the previously described control valve 24. A pressure relief valve 224 is connected in series in the delivery conduit 222. If the pressure of fluid is in excess of that at which the valve 224 relieves, the fluid will pass from the pressure relief valve 224 through a relief conduit 226 to the upper reservoir 168 adjacent the right longitudinal extremity thereof so as to return pressure fluid to the reservoir, thus protecting the system from possible damage. The pressure relief conduit 226 includes a manual shut-off valve 228 connected in series adjacent the connection to the upper reservoir 168. If, however, the pressure of the fluid is less than that at which the pressure relief valve 224 relieves, the fluid continues its passage through the delivery conduit 222.

A second fluid filter 227 is connected in series in the delivery conduit 222 between the pressure relief valve 224 and the control valve 24. The second filter 226 is positioned adjacent and forwardly of the first filter 192. The two filters are supported by a U-shaped filter bracket, generally denoted 230, comprising a horizontally extending top member 232 from which the filters depend, supported at its opposed longitudinal extremities by depending rear and forward webs 236 and 238 respectively. The rear and forward webs 236 and 238 are secured at their respective lower extremities to the rear and central base members 40 and 46. The webs 236 and 238 and top member 232 are all formed from right angle section channel.

The previously described control valve 24 in the preferred embodiment is a 4-way, 3 position spool valve of the type manufactured and sold by Dukes Company, Inc. of Shiller Park, Ill., and designated as model No. DV 123. However, it will be appreciated that other suitable 4-way 3 position valves may be employed. The control valve 24 includes a housing having axially spaced left, central and right interior regions 24a, 24b, 24c, respectively, and a spool member 24d within and selectively movable between the interior regions.

The valve 24 includes a supply connection 240 to the delivery conduit 222 through which fluid is delivered to the valve 24. A fluid inlet conduit 242 connected at one extremity to the valve 24 is connected at its other extremity to the inlet, swivel pipe joint 138 previously described.

A solenoid operated bypass valve 243 is connected in series in the fluid inlet conduit 242 intermediate the control valve 24 and the joint 138 for a purpose to be described hereinafter.

In a neutral position of the control valve 24 as shown in FIGURE 2, in which spool member 24d is centered, fluid is directed through an internal fluid path 24e in the control valve 24 connecting the delivery conduit 222 with the fluid inlet conduit 242 so that fluid passes directly to the delivery hose 10.

The previously described, fluid pressure operated, reversible reel motor 26 is connected to the control valve 24 by first and second fluid conduits 244 and 246 respectively. In a first selected position of the control valve, in which spool member 24d is shifted to the right in FIGURE 2, fluid is directed through an interior path 24f in valve 24 connecting the delivery conduit 222 with the first conduit 244 to the reel motor 26 which rotates the reel 6 in a winding direction to wind hose onto the reel by a drive assembly which will be described more fully hereinafter. Fluid leaving the reel motor 26 then passes through the second conduit 246 back to the control valve 24 and through a path 24g in the control valve 24 to the fluid inlet conduit 242 and from there to the delivery hose 10.

In a second selected position of the control valve in which spool member 24d is shifted left within control valve 24, as shown in FIGURE 2, fluid is directed through a path 24h connecting delivery conduit 222 with the second conduit 246 to the driving motor 26 which rotates the reel 6 in an unwinding direction to unwind the hose from the reel 6. Fluid leaving the reel motor 26 in this event, passes through the first conduit 244 back to the control valve 24, through a path 24k in the control valve 24 to the fluid inlet conduit 242 and to the delivery hose 10.

It will be seen that in all selected positions of the control valve 24 fluid under pressure is supplied either directly or ultimately to the fluid operated tool 14 through the delivery hose 10. This arrangement provides the substantial advantage that the tool 14 may continue to be used without interruption even when the reel 6 is being rotated by the reel motor 26 to move the hose.

The control valve 24 is secured to a right angle bracket 247 connected to the forward left vertical member 50 in a convenient position for operation of the valve 24 by the operator so that he may easily control the direction of fluid under pressure to the reel motor or to the delivery hose.

The tool 14 may be of any type suitable for use under water and one example of a tool that may be utilized with the present invention is the model H5510 Impact Wrench manufactured and sold by Fairmont Railway Motors, Inc. of Fairmont, Minn.

Fluid delivered to the tool 14 by the delivery hose 10 is returned from the tool 14 by the previously described return hose 12 through the return branch connection 158 to a fluid return conduit 250 in fluid communication with the upper fluid reservoir 168. In the preferred embodiment the fluid conduit 250 is connected at one extremity to the return swivel pipe joint 160 and at its other extremity to a T-junction 252 in the pressure relief conduit 226 adjacent the connection thereof to the upper fluid reservoir 168. A check valve 253 is fluidly connected in series intermediate the return branch connector 158 and the T-junction 252 for a purpose to be described hereinafter. By providing such a return path for fluid leaving the tool 14, the fluid may be conserved and recycled in an economically advantageous manner. However, it will be appreciated that where an inexpensive operating fluid such as for example sea water is utilized the return path may be dispensed with and fluid permitted to exhaust directly from the tool 14.

*Reel drive assembly*

The previously described reel motor 26 is secured to the left lower support member 96 of the reel support frame 8 by any suitable connectors, such as for example threaded connectors. The motor 26 is of the fluid pressure responsive, reversible type possessing the characteristic that it may rotate in either a forward or a reverse direction dependent upon the direction of fluid flow through the motor. Such fluid motors are widely commercially available. Referring to FIGURE 6, the motor 26 includes a horizontally disposed, transversely extending output power shaft 254 having a driving cog wheel 256 secured to its free, left extremity.

The driving cog wheel 256 is connected by an endless, linked first chain 258 to a first intermediate cog wheel 260 positioned in the plane of the driving cog wheel 256, of relatively larger diameter than the driving cog wheel 256. The first intermediate cog wheel 260 is secured to one end of a horizontally disposed transversely extending intermediate shaft 262, the intermediate shaft 262 being rotatably mounted on a bracket 264 secured to the rear surface of the left rear inclined member 108 of the reel support frame 8. The other end of the intermediate shaft 262 is secured to a second intermediate cog wheel 266 of relatively smaller diameter than that of the first intermediate cog wheel 260. The second intermediate cog wheel 266 lies in the plane of the toothed left flange 126 of the reel 6 and is drivingly connected thereto by an endless linked second chain 268.

It will be seen that by having a driving cog wheel 256 of relatively smaller diameter than the first intermediate cog wheel 260 which it drives, a first speed reduction is obtained, also, by having a second intermediate cog wheel 266 of relatively smaller diameter than the toothed flange 126 which it drives, a second speed reduction is obtained. The two speed reductions enable the reel 6 to be rotated at a considerably slower rate than that at which the reel motor 26 rotates, thereby enabling more precise reel movement to be achieved. In addition, the considerable mechanical advantage imparted by the reduction system permits a relatively low power reel motor to be utilized to rotate the reel with consequent advantages in economy and compactness.

In order to ensure that clothing and the like is not caught in either the rotating chains or cog wheels and that dirt is excluded therefrom, first and second chain guards 270 and 272 respectively are provided. The first chain guard 270 comprises a flat vertically disposed outer plate 274 having a horizontally disposed, inwardly extending rim 276 about its periphery, which is positioned about and encloses the first driving chain 258. The first cover 270 is secured to the adjacent left inclined member 108 by a suitable bracket (not shown). Similarly the second cover 272 comprises a flat vertically disposed outer plate 278 having an inwardly directed horizontal rim 280 about its periphery, which is positioned about and encloses the second driving chain 268. The second cover 272 is secured to adjacent portions of the reel support frame by suitable attachment brackets (not shown).

*The brake*

Figure 7:
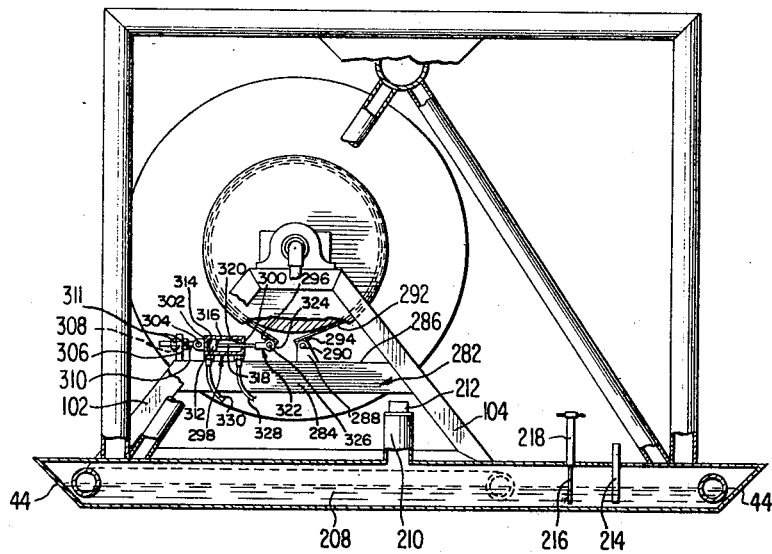
FIGURE 7 is a part sectional, side view from the right side of the fluid handling apparatus shown in FIGURE 1 showing the brake and fuel reservoir for the engine.

Referring to FIGURES 5 and 7, the previously mentioned brake 28 includes a horizontally disposed brake support bar 282 secured at itse extremities to the forward and rear inclined members 102 and 104 of the reel support frame 8. The support bar 282 is of angle section and includes a vertically extending web 284 secured to the adjacent inclined members 102 and 104 inwardly thereof and an inwardly directed horizontal flange 286 along the upper extremity of the web. Secured to the upper surface of the horizontal flange 286 adjacent the midpoint of the support bar 282 are a pair of transversely spaced, vertically extending brackets 288. A horizontally disposed, transversely extending pin 290 has its exposed extremities supported by the bracket 288 adjacent their vertical extremities. A brake band 292 provided at its rear extremity with an apertured lug 294 positioned about and receiving the horizontal pin 290, extends circumferentially therefrom about the periphery of the reel drum 132. The forward extremity of the brake band is similarly provided with an apertured lug 296. In a non-applied position of the brake, the two lugs 296 and 294 are positioned in the same horizontal plane with the forward lug 296 spaced longitudinally forwardly of the lug 294.

The brake assembly also includes a brake cylinder 298. The brake cylinder 298 is of uniform internal diameter and includes a closed rearward, or first, extremity 300 and a closed forward, or second, extremity 302. A forwardly directed lug 304 is positioned on the exterior of the brake cylinder 298 on the forward extremity 302 thereof.

A brake cylinder support bracket 306 is secured to the upper surface of the horizontal flange 286 of the support bar 284 and extends transversely thereof. The brake cylinder support bracket 306 includes an aperture 308 adjacent its upper extremity through which passes a longitudinally extending, threaded support rod 310. Lock nuts 311 threaded on the support rod 310 on either side of the brake cylinder support bracket 306, secure the rod 310 to the bracket 306 and permit the longitudinal position of the support rod 310 relative to the bracket 306 to be adjusted. The rearward extremity of the support rod 310 is pivotally connected to the lug 304 on the forward extremity 302 of the brake cylinder 298 so as to permit pivotal motion of the brake cylinder 298 in the vertical plane about the point of pivotal connection to the support rod 310.

A piston 312 is slidably and sealingly received within the brake cylinder 298. The piston 312 includes forward and rear surfaces 314 and 316 respectively adjacent the forward and rear extremities 300 and 302, respectively, of the brake cylinder 298. A piston rod 318 is secured to the rearward surface 316 of the piston 312. The piston rod 318 reduces the area of the rear surface 316 of the piston exposed to fluid pressure relative to the area of the forward surface 314 of the piston exposed to fluid pressure, by an amount equal to the cross sectional area of the piston rod 318. The piston rod 318 extends axially rearwardly from the piston 312 out through an aperture 320 in the rear extremity 300 of the brake cylinder 298. The aperture 320 is provided with a seal (not shown) to permit the piston rod 318 to be sealingly and slidably received within the aperture 320.

The rearward extremity of the piston rod 318 is provided with a bifurcated connector 322 having two horizontally disposed, transversely spaced, rearwardly extending arm portions 324. A horizontally disposed pin 326 has its opposed transverse extremities received within aligned apertures in the arm portions 324. The pin 326 passes through the rear apertured lug 296 on the brake band 292.

A brake cylinder first conduit 328 has one extremity connected to the brake cylinder 298 adjacent to the rearward extremity 300 thereof and its other extremity connected to the fluid inlet conduit 242 adjacent the control valve 24. The brake cylinder first conduit 328 directs fluid from the fluid inlet conduit 242 to the rearward surface 316 of the movable piston 312.

A brake cylinder second conduit 330 has one extremity connected to the brake cylinder 298 adjacent the forward extremity 302 thereof and its other extremity connected to the delivery conduit 222 adjacent the control valve 24. The brake cylinder second conduit 330 directs fluid from the delivery conduit 222 to the forward surface 314 of the piston 312.

In operation, when the control valve 24 is in the neutral position with fluid being delivered directly from the delivery conduit 222 through the valve 24 to the fluid inlet conduit 242 and from thereto the delivery hose 10, the pressure of fluid in the delivery conduit 222 will be the same as that in the fluid inlet conduit 242. In this event the fluid pressures on either side of the movable piston 312 in the brake cylinder 298 will be equal. However, because the area of the rear surface 316 of the piston 312 is reduced relative to that of the forward surface 314 by the piston rod 318, the force on the forward surface 314 will be greater than that on the rearward surface 316 and the piston 312 will move rearwardly in the brake cylinder 298 to an extreme rearward position. The rearward movement of the piston 312 and hence of the rearward extremity of the piston rod 318 moves the lug 296 toward the lug 294 causing the brake band 292 to be tightened about the reel drum 132 so as to prevent rotation of the reel 6 relative to the reel support frame 8.

When the control valve 24 is selected to direct fluid through the first or second reel motor conduits 244 and 246 respectively, the pressure in the fluid inlet conduit 242 will be less than that in the delivery conduit 222 by the amount of the pressure drop across the reel motor 26 caused by operation of the motor 26 in rotating the reel 6. In this event, the fluid directed to the forward surface 314 of the piston 312 through the brake cylinder second conduit 330 will be at a lower pressure than that delivered to the rearward surface 316 of the movable piston 312 through the brake cylinder first conduit 328. The force on the rearward surface 316 of the piston is then greater than that on the forward surface 314 so that the piston 312 moves forwardly in the brake cylinder 298 thereby releasing the brake 292 and permitting the reel 6 to be rotated.

It will be seen that the arrangement described permits the brake to be released entirely automatically whenever it is desired to rotate the reel and to be applied equally automatically whenever the control valve is set to deliver fluid directly to the delivery hose. Such a brake arrangement enables considerably closer control of hose movement to be achieved as it prevents the hose reel, which possesses considerable inertia, from overrunning after controlled movement of the hose has ceased by automatically and immediately applying the brake to prevent further rotation of the reel.

The brake additionally ensures that hose may not be inadvertently unwound from the reel by the weight of a portion of hose depending from the reel or by wind and wave action on such a depending portion.

The longitudinal adjustment of the threaded support rod 310 which may be affected by means of the nuts 311 permits the longitudinal position of the brake cylinder 298 to be altered to provide any adjustment that may be necessary to obtain the most efficient braking. Such adjustments may be necessary for example, to compensate for stretching of the brake band 292 in use or when a replacement brake band 292 is installed. Additionally, the pivotal connection between the support rod 310 and the brake cylinder 298 permits the brake cylinder and piston rod to move angularly vertically as may be required for the most efficient braking.

In order to protect the first and second reel motor conduits 244 and 246 from the effects of momentary overpressures that might possibly be caused by abrupt stopping of the reel 6 by the brake 292 after controlled rotation has ceased, a cushion valve 334 (see FIGURE 2) is provided. The cushion valve which is of a conventional, commercially available type is connected between the first and second reel motor conduits 244 and 246. If abrupt stopping of the reel motor should cause the pressure of fluid in either of the reel motor conduits 244 or 246 to rise to a value in excess of that which the cushion valve relieves, fluid will pass through the cushion valve 334 from the reel motor conduit at the relatively higher pressure to the other reel motor conduit. Thus, the cushion valve 334 protects the reel motor conduits 244 and 246 and reel motor 26 from possible damage caused by momentary overpressures.

*Operator platform and hose guides*

Referring to FIGURES 3 and 4, the previously described operator platform 30 includes a rectangular, lattice-like, open metal grid 336 provided with longitudinally extending right and left end members 338 and 340 respectively at its transversely opposed extremities. Each end member 338, 340 extends longitudinally rearwardly of the grid 326. The rear extremities of the end members 338, 340 are pivotally connected to identical right and left pivot bracket 342 secured to the right and left base members 34 and 36. Each pivot bracket 342 is additionally secured to the forward surface of one of the adjacent forward vertical support members 48 and 50 adjacent the respective points of connection thereto to the longitudinal base members 34 and 36. Each pivot bracket 342 includes two transversely spaced vertically and forwardly extending plates 346. Each pivot bracket 342 also includes a horizontal pivot pin 348 passing through an aperture in the adjacent grid end member and having its opposed extremities supported on the plates 346. The ends of the grid end members are rounded so as to permit them to rotate within the pivot brackets 342 about the pivot pins 348.

The grid 336 is prevented from downward rotation below a horizontal position about the pivot points 348 by the forwardly extending right and left extremities of the right and left base members 34 and 36 and is supported in the horizontal position thereby, extending forwardly of the frame 2.

The grid end members 338 and 340 extend forwardly of the grid 336 and are pivotally connected at their forward extremities to right and left vertical platform members 350 and 352 respectively extending perpendicularly upwardly from the grid. The right and left vertical platform members 350 and 352 are joined at their upward extremities by horizontally disposed transversely extending platform top rod 354. A horizontally disposed transversely extending platform middle rod 356 has its opposed extremities secured to the right and left platform vertical members 350 and 352 adjacent the midpoints thereof.

To maintain the platform vertical members 350 and 352 in a vertical position, horizontally disposed, longitudinally extending right and left linkrods 358 and 360 respectively are provided. Each link rod is pivotally connected at its forward extremity to the adjacent platform vertical member adjacent the midpoint thereof and extends rearwardly at right angles therefrom. The pivotal connection may be any suitable means such as for example an elongate connector provided with a plain shank portion on which the link rod may rotate. The rearward extremity of each link rod is pivotally connected to one of two horizontally disposed, forwardly extending right and left link support brackets 362 and 364 secured to the right and left vertical support members 48 and 50 respectively. The platform vertical members 350 and 352, platform transverse rods 354 and 356 and the link rods 358 and 360 form a protective guard enclosure about the grid 336 so that an operator standing on grid 336 is prevented from accidentally falling from the grid 336.

An operator standing on the grid 336 has a clear, direct and substantially unobstructed view of hose moving onto and from the reel 6 at the same time that he is conveniently positioned to operate the adjacent control valve 24 and engine throttle 206.

The successful use of the underwater fluid operated tools is often largely dependent upon the efficient control of hose movement and the provision of a platform which permits the operator to control the reel while directly observing the movement of the hose has been found to offer considerable advantages.

So that the fluid handling apparatus may occupy a minimum space when not in use, as may be important for example on the deck of a floating vessel, the operator platform 30 may be folded to a non-use position. For this purpose the grid 336 is rotated upwardly about the pivot points 348 until it lies along the right and left forward vertical support members 48 and 50. In this position, the vertical platform members 350 and 352 will be positioned above the grid 336 in vertical alignment therewith in abutting contact with the forward vertical support members 48 and 50. At the same time the link rods 358 and 360 will pivot to a vertical position adjacent the vertical platform members 350 and 352. The platform may be held in its non-use position by suitable hooks and chains or the like (not shown) attached to the vertical support members 48 and 50.

So that the hoses 10 and 12 leaving the reel 6 may not scuff upon or be damaged by adjacent portions of the frame 2 or platform 30, protective rollers are provided. Referring to FIGURES 3 and 5, transversely extending, rotatably mounted, longitudinally spaced forward and rear rollers 368 and 370, respectively, are provided. The rearward roller (FIGURE 5) comprises a central portion 372 of uniform diameter having end portions 374 of relatively reduced diameter. The end portions 374 are supported for rotation about a horizontal axis by depending transversely spaced bearings 376 secured to the undersurface of the right and left lower members 94, 96 of the reel support frame. The rear transverse roller is positioned vertically beneath the forward peripheral edge of the drum 132 of the reel 6. The forward transverse roller 368 is of similar construction and is supported by similar bearings 378 secured to the undersurface of the right and left lower members 94 and 96 respectively, of the reel support frame 8 adjacent the forward transverse member 38. Hose depending vertically from reel 6 when reel 6 is fully wound passes closely adjacent the forward roller 368. Hose depending vertically from the reel 6 when the reel is empty passes closely adjacent the rear roller 370. Thus, in either extreme condition of hose upon the reel 6, the hose is prevented from scuffing upon the frame or platform by the forward and rearward rollers 368 and 370 which rotate about their axes of rotation when contacted by the hose so as to prevent any damaging impact thereto.

Right and left, longitudinally extending, laterally spaced end rollers 380 and 382, respectively, are also provided. The left end roller 382 includes a central portion 384 of uniform diameter and end portions 386 of relatively reduced diameter. The end portions 386 are mounted for rotation in end bearings 388 secured to the forward and central lower transverse members 118 and 119, respectively, of the reel support frame 8 and support the left end roller 382 for rotation about a horizontal axis spaced vertically above the forward and rear rollers 368 and 370.

The right end roller 380 is of similar construction as the left end roller 382 and is supported on similar end bearings 390 secured to the forward and central lower transverse members 118 and 119 respectively of the reel support frame.

The right and left end rollers 380 and 382 are generally aligned with the right and left reel discs 136 and 134 so that hose depending from either transverse extremity of reel 6 will not be damaged by impact against adjacent portions of the frame but will merely rotate whichever of the end rollers it comes into contact with.

Fluid-loss prevention system

In order to prevent the hydraulic fluid from being lost in the event of rupture of either of the delivery or return hoses 10 and 12 respectively, a fluid-loss prevention system is provided. The system includes the previously mentioned solenoid operated bypass valve 243 which may be of any suitable commercially available type. In the operation of the fluid-handling apparatus as heretofore described, the bypass valve 243 has been considered as being in its energized condition permitting flow through the bypass valve along the fluid inlet conduit 242 from the control valve 24 to the fluid inlet joint 138. In a de-energized condition of the bypass valve 243, however, fluid entering the bypass valve 243 through the fluid inlet conduit 242 is directed through a bypass conduit 398 to the previously described pressure relief conduit 226 and thence to the reservoir 18, thereby bypassing the delivery and return hoses 10 and 12.

In order to control the operation of the solenoid operated bypass valve 243, an electrical control circuit is provided. The circuit includes a battery 400 having one side thereof connected through an ON-OFF switch 402 by a power line 403 to one side of an energizing coil 404 of the solenoid portion of the bypass valve 243. The other side of the coil 404 is electrically connected by a base line 405 to a normally open pressure responsive switch 406 having a pressure responsive element positioned in the fluid return conduit 250. A ground line 408 connected to the other side of the battery 400 may be electrically connected to the base line 405 by a spring-loaded push button switch 410. The ground line 408 is also electrically connected to the other side of the pressure responsive switch 406.

In operation, the operator closes the ON-OFF switch 402 and depresses the push button 410 thus completing an electrical circuit from the battery 400 through the ON-OFF switch 402, the solenoid coil 404, the push button switch 410 and the ground line 408. Completion of the circuit through the coil 404 causes the bypass valve 243 to be placed in its energized condition in which fluid is directed through the bypass valve from the control valve 24 to the inlet joint 138, as previously described. As fluid pressure builds up in the fluid return conduit 250 to that at which the check valve 253 permits flow, the pressure responsive switch 406 will close at a predetermined relatively lower pressure thereby completing an electrical holding circuit from the ground line 408 through the pressure responsive switch 406 to the solenoid coil 404 bypassing the push button switch 410, which may then be released.

If at any time either of the delivery or return hoses should rupture, the fluid pressure in the fluid return conduit would drop immediately to a level below that at which the pressure responsive switch 406 is set to open, thus de-energizing the coil 404 and permitting the bypass valve 243 to bypass the fluid leaving the control valve 24 directly back to the reservoir 18. In this manner, leakage of the relatively expensive operating fluid through a rupture occurring in either of the delivery and return hoses 10 and 12 is prevented.

*Summary of advantage and scope of invention*

In constructing a fluid handling apparatus including a reel according to the present invention, it will be seen that an apparatus particularly suitable for supplying fluid under pressure to fluid pressure operated tools intended for use under water, is provided. In particularly, the provision of a reel motor possessing reversible operating characteristics permits the hose to be unwound from the reel without requiring any pull to be exerted upon the hose. In this manner hose may be unreeled rapidly and without manual exertion despite considerable inertia of the hose when coiled on the reel. Furthermore, no tensile strain is exerted upon the hose during unreeling, thereby providing enhanced hose life and avoiding the possibility of leaks at the point of connection of the tool to the hose which might cause loss of pressure fluid into the surrounding medium or contamination of the pressure fluid in the hose. An additional significant advantage is provided by the series fluid communication between the reel motor and tool when fluid is being delivered to the reel motor to rotate the reel. Such an arrangement permits continued uninterrupted operation of the underwater tool even while the reel motor is being utilized to move the hose.

Another particularly important advantage is derived from the provision of a return hose for returning fluid from the tool to the source of fluid under pressure. Such provision enables the pressure fluid used for operating the tool to be conserved and recycled in an economically advantageous manner.

Further significant advantages are provided by the automatically applied brake which insures that hose may not be inadvertently unwound from the reel by the weight of a portion of the hose depending from the reel. Moreover, by providing a brake which is applied automatically whenever the possibility of overrunning of the hose after the motor has been disconnected from the fluid under pressure is substantially reduced, thus permitting more accurate control of the hose movement.

Further advantages are afforded by the vertically spaced, interconnected, upper and lower fluid reservoirs which insure that fluid is supplied to the pump under positive pressure thereby reducing the possibility of pump starvation due to wave motion affecting the fluid in the reservoirs. Additionally, the perpendicular disposition of the longitudinal axes of the fluid reservoirs advantageously insures that pitching or rolling of the supporting floating vessel in one direction at any time will leave the fluid in at least one of the reservoirs unaffected.

The platform for the operator offers considerable advantages when the invention is used at sea on a floating vessel in that it permits an operator standing in a position from which he may control the rotation of the reel to obtain a direct and substantially unobstructed view of the hose in its movement from the vessel so that close and accurate control of the hose may be maintained.

Additional advantages are provided by the bypass valve controlled by the pressure of fluid returning from the tool, in that flow of fluid through the hoses is automatically terminated before substantial waste of the fluid or contamination by sea water can occur, in the event of a hose rupture. Additionally, the bypass system permits the reel brake and drive system to continue to operate in the event of such a hose rupture.

Although the invention has been described with reference to a preferred embodiment intended for use in supplying pressure fluid to a fluid operated tool intended for use under water, it will be appreciated that other embodiments of the invention suitable for other applications may be provided. For example, a second embodiment of the invention, not provided with a return hose or fluid operated tool, may be utilized on a vehicle such as a petrol tanker, fire engine, or the like, for use as a fluid delivery apparatus.

It will be appreciated that the terms, "upper," "lower," "left," "right," "forward" and "rear," as used to describe the components on the fluid handling apparatus, are merely employed to indicate relative placement of such components with respect to one another and are not intended as limitations.

Although the invention is described with reference to the preferred embodiment, it will be apparent to those skilled in the art that additions, deletions, modifications, substitutions, and other changes not specifically described and illustrated in the preferred embodiment may be made which will fall within the purview of the appended claims.

I claim:
1. A fluid handling apparatus for supplying fluid under pressure to a fluid pressure operated tool, said fluid handling apparatus comprising:
   a source of liquid under pressure, adapted to supply fluid under pressure to the tool,
   flexible, elongate delivery hose means in fluid communication with said tool for directing fluid thereto,
   a rotatable reel on which said delivery hose means may be wound,
   fluid inlet means connected with said reel in fluid communication with said delivery hose means for directing fluid thereto,
   reversible, pressure responsive driving means connected with said reel for selectively rotating said reel in winding and unwinding directions for winding said delivery hose means onto and off said reel respectively, said driving means including first and second conduit means for separately directing fluid to said driving means, said driving means rotating said reel in the winding direction when fluid is directed to said driving means through said first conduit means and said driving means rotating said reel in the unwinding direction when fluid is directed to said driving means through said second conduit means, and
   fluid directing, control means in fluid communication with said source of fluid under pressure, said control means being selectively connectable with said fluid inlet means, said first conduit means, and said second conduit means for selectively directing fluid from said source of fluid under pressure to one of said fluid inlet means, first conduit means and second conduit means.

2. A fluid handling apparatus in accordance to claim 1:

wherein said source of fluid under pressure comprises,
a fluid reservoir,
pressure means in fluid communication with said reservoir for delivering fluid under pressure from said reservoir;
said fluid handling apparatus further including,
flexible elongate return hose means in fluid communication with said tool for directing fluid leaving said tool, said return hose means being substantially coextensive with said delivery hose means, said return hose means being wound concurrently with said delivery hose means on said rotatable reel, and
fluid return means connected with said reel in fluid communication with said return hose means and with said fluid reservoir for returning fluid from said tool to said fluid reservoir.

3. A fluid handling apparatus in accordance to claim 1, said control means being adapted to selectively place said source of fluid under pressure in series fluid communication with either of said conduit means, said driving means, the other of said conduit means and said fluid inlet means.

4. A fluid handling apparatus in accordance to claim 1 further including:
frame means connected with said reel supporting said reel for rotation,
brake means connected with said reel and said frame means, said brake means operatively connected with said control means for preventing movement of said reel relative to said frame means upon selective connection of said source of fluid under pressure to said fluid inlet means by said control means.

5. A fluid handling apparatus in accordance to claim 4 wherein said brake means comprises:
a brake cylinder secured to said frame means, said brake cylinder including first and second closed extremities,
a piston slidingly and sealingly mounted in said brake cylinder, said piston including opposed first and second faces adjacent said first and second extremities of said brake cylinder respectively,
an axially extending piston rod secured to said first face of said piston, said piston rod extending axially outwardly through an opening in said first extremity of said brake cylinder in sealing and sliding contact therewith, said piston rod reducing the area of said first surface exposed to fluid pressure in said brake cylinder relative to the area of said second surface exposed to fluid pressure in said brake cylinder,
first brake cylinder conduit means connected to said brake cylinder adjacent said first extremity thereof and to said fluid inlet means for directing fluid therefrom to said first surface of said piston,
second brake cylinder conduit means connected to said cylinder adjacent said second extremity thereof and to said source of fluid under pressure for directing fluid therefrom to said second surface of said piston, and
actuatable brake means connected with said frame means and said reel for preventing movement of said reel relative to said frame means upon actuation of said brake means, said brake means being connected with said piston rod for actuation of said brake means upon movement of said piston rod to an extreme outward position of said piston rod relative to said brake cylinder.

6. A fluid handling apparatus in accordance to claim 1 wherein said fluid handling apparatus is mounted on a floating vessel, said fluid handling apparatus further including:
frame means connected with said reel supporting said reel for rotation, said frame means adapted to be mounted on the vessel adjacent a peripheral edge thereof with the axis of rotation of said reel generally parallel and adjacent to the peripheral edge of the vessel so as to permit said hoses to be unreeled over the edge of the vessel,
horizontally disposed platform means connected to said frame means extending sidewardly outwardly of the vessel for supporting an operator,
said frame means including an aperture adjacent said reel means through which said hose means may pass vertically from said reel;
said control means being positioned on said frame means adjacent said platform means, whereby the operator positioned on said platform means may control the operation of said reel while maintaining said hose means directly in view.

7. A fluid handling apparatus in accordance to claim 6 wherein said frame means includes:
a plurality of spaced opposed first roller means rotatably mounted on said frame means defining two spaced opposed first sides of said aperture, each of said first roller means including a longitudinal axis parallel to the axis of rotation of said reel, and
a plurality of spaced opposed second roller means rotatably mounted on said frame means defining two spaced opposed second sides of said aperture, each of said second roller means including a longitudinal axis perpendicular to the axis of rotation of said reel,
said first and second roller means rotating about their respective longitudinal axes relative to said frame means on contact with said hose means passing through said aperture, whereby said hoses are prevented from scuffing on said frame means.

8. A fluid handling apparatus in accordance to claim 2 wherein said reservoir means comprises:
lower reservoir means in fluid communication with said pressure means for storing fluid,
upper reservoir means for storing fluid, positioned above said lower reservoir means,
support means connected with said upper and lower reservoir means for supporting said upper reservoir means above said lower reservoir means, said support means including interconnecting conduit means for directing fluid between said upper and lower reservoir means,
said fluid return means being in fluid communication with said upper reservoir means for directing fluid thereto.

9. A fluid handling apparatus in accordance to claim 8 wherein:
one of said reservoir means includes a longitudinal axis, and the other of said reservoir means includes a longitudinal axis perpendicular to the longitudial axis of said one of said reservoir means.

10. A fluid handling apparatus for supplying fluid under pressure to a fluid pressure operated tool, said fluid handling apparatus comprising:
a fluid reservoir,
pressure means in fluid communication with said reservoir for delivering fluid under pressure from said reservoir,
flexible elongate delivery hose means in fluid communication with said tool for directing fluid thereto,
a rotatable reel on which said delivery hose means may be wound,
fluid inlet means connected with said reel in fluid communication with said delivery hose means for directing fluid thereto,
pressure responsive drive means connected with said reel for rotating said reel in at least one direction, said driving means including conduit means for directing fluid to said driving means, said driving means rotating said reel when fluid is directed to said driving means through said conduit means,
fluid directing, control means in fluid communication with said pressure means, said control means being selectively connectable with said fluid inlet means and said conduit means for selectively directing fluid to one of said fluid inlet means and conduit means, flexible elongate return hose means substantially coextensive with said delivery hose means in fluid communication with said tool, said return hose means being wound concurrently on said reel with said delivery hose means, and fluid return means connected with said reel in fluid communication with said return hose means and with said fluid reservoir for returning fluid to said fluid reservoir.

11. A drive assembly for a fluid handling apparatus, the fluid handling apparatus including a source of fluid under pressure, elongate flexible hose means and a rotatable reel on which said hose means may be wound; said drive assembly comprising:

fluid inlet means adapted to be connected with the reel in fluid communication with the hose means for directing fluid to the hose means, reversible, pressure responsive driving means adapted to be connected with the reel for selectively rotating the reel in winding and unwinding directions for winding the hose means onto and off the reel respectively, said driving means including first and second conduit means for separately directing fluid to said driving means, said driving means rotating the reel in the winding direction when fluid is directed to said driving means through said first conduit means and said driving means rotating the reel in the unwinding direction when fluid is directed to said driving means through said second conduit means, and fluid directing control means in fluid communication with the source of fluid under pressure, said control means being selectively connectable with said fluid inlet means to direct fluid through said hose means, said first conduit means, and said second conduit means for selectively directing fluid to one of said fluid inlet means, first conduit means and second conduit means respectively.

12. A drive assembly for a fluid handling apparatus in accordance to claim 11 wherein the reel is supported for rotation on a frame, said drive assembly further including:

brake means adapted to be connected with the reel and with the frame, said brake means adapted to be operatively connected with the source of fluid under pressure and with said fluid inlet means for preventing movement of the reel upon equalization of the fluid pressures in the source of fluid under pressure and in said fluid inlet means.

13. A drive assembly for a fluid handling apparatus in accordance to claim 11 wherein the fluid handling apparatus is mounted on a floating vessel, said drive assembly further including:

frame means adapted to be connected with the reel supporting the reel for rotation, said frame means adapted to be mounted on the vessel adjacent a side thereof with the axis of rotation of the reel generally parallel and adjacent a portion of the periphery of the vessel and with a forward peripheral surface of the reel positioned outwardly of the vessel so as to permit the hose to be unreeled from the vessel, said frame means further including an aperture adjacent the reel through which the hose means may pass vertically from the reel, and horizontally disposed platform means connected to said frame means extending outwardly therefrom on the opposite side of the hose means from the reel, whereby an operator positioned on said platform means may maintain the hose memans directly in view during the movement of the hose means to and from the reel relative to the vessel.

14. A fluid handling apparatus in accordance to claim 2 further including:

actuatable bypass means in fluid communication with said reservoir, said bypass means being placed in fluid communication with said fluid inlet means upon actuation of said bypass means to direct the fluid in said fluid inlet means to said reservoir thereby bypassing said hose means, and pressure responsive actuating means responsive to the pressure of the fluid in said fluid return means, said actuating means actuating said bypass means upon a change of pressure of fluid in said fluid return means.

15. A fluid handling apparatus in accordance to claim 1 further including:

a reservoir, actuatable bypass means in fluid communication with said reservoir, said bypass means being placed in fluid communication with said fluid inlet means upon actuation of said bypass means to direct the fluid in said fluid inlet means to said reservoir thereby bypassing said hose means, and pressure responsive actuating means responsive to the pressure of the fluid in said hose means, said actuating means actuating said bypass means upon a change of pressure of fluid in said hose means.

References Cited

UNITED STATES PATENTS

| | | | |
|---|---|---|---|
| 2,573,868 | 11/1951 | Newell | 137—355.21 |
| 2,640,724 | 6/1953 | Sanders et al. | 137—355.17 XR |
| 2,783,089 | 2/1957 | Prout | 137—355.17 |
| 2,823,074 | 2/1958 | Bernard | 137—355.17 |
| 2,989,980 | 6/1961 | Cullen et al. | 137—355.26 |
| 3,128,861 | 4/1964 | Trondsen | 254—187 XR |
| 3,190,307 | 6/1965 | Vries | 137—355.21 XR |
| 3,249,336 | 5/1966 | Brown et al. | 254—187 XR |

SAMUEL SCOTT, *Primary Examiner.*